(12) United States Patent
Sheng et al.

(10) Patent No.: US 10,706,183 B2
(45) Date of Patent: Jul. 7, 2020

(54) COMPUTING BOUNDARY CONTINUITY CONSTRAINTS FOR PATCHING CURVE NETWORKS

(71) Applicant: Autodesk, Inc., San Rafael, CA (US)

(72) Inventors: Xuejun Sheng, Ypsilanti, MI (US); Wayne Catalfano, Novi, MI (US)

(73) Assignee: Autodesk, Inc., San Rafael, CA (US)

(*) Notice: Subject to any disclaimer, the term of this patent is extended or adjusted under 35 U.S.C. 154(b) by 618 days.

(21) Appl. No.: 13/787,570

(22) Filed: Mar. 6, 2013

(65) Prior Publication Data
US 2014/0257759 A1 Sep. 11, 2014

(51) Int. Cl.
*G06F 30/00* (2020.01)
*G06F 111/04* (2020.01)

(52) U.S. Cl.
CPC .......... *G06F 30/00* (2020.01); *G06F 2111/04* (2020.01)

(58) Field of Classification Search
None
See application file for complete search history.

(56) References Cited

U.S. PATENT DOCUMENTS

| | | | | |
|---|---|---|---|---|
| 2007/0176923 A1* | 8/2007 | Lee | ...................... | B66D 3/006 345/420 |
| 2008/0225043 A1* | 9/2008 | Rosel | ........................ | 345/420 |

OTHER PUBLICATIONS

Varady T., Rockwood A., Salvi P.: Transfinite surface interpolation over irregular n-sided domains. Computer Aided Design 43, 11 (2011), 1330-1340.*
Hartmann, Erich. "Parametric G n blending of curves and surfaces." The Visual Computer 17.1 (2001): 1-13.*
Xu, Guoliang, and Qin Zhang. "G2 surface modeling using minimal mean-curvature-variation flow." Computer-Aided Design 39.5 (2007): 342-351.*
Szeliski et al., "Curvature and Continuity Control in Particle-based Surface Models," SPIE Geometric Methods in Computer Vision II (1993) (retrieved from http://research.microsoft.com/pubs/75648/Szeliski-SPIE93.pdf), 10 pages.
Zhou, "$G^2$ Continuity Algorithms between Adjacent NURBS Patches along Common Cubic Boundary Curve," Chinese Journal of Aeronautics, 16(4):241-246 (2003).
"Inventor Fusion Technology Preview 4," (2011) [online] (retrieved from http://www.cadprofessor.in/2010/11/inventor-fusion-technology-preview-4/), 10 pages.
"Bézier Surfaces," (2005) [online] (retrieved from http://homepages.infled.ac.uk/rbf/CVonline/LOCAL_COPIES/AV0405/DONAVANIK/bezier.html), 4 pages.

* cited by examiner

Primary Examiner — Bijan Mapar
(74) Attorney, Agent, or Firm — Fish & Richardson P.C.

(57) ABSTRACT

Methods, systems, and apparatus, including computer programs encoded on a computer storage medium, for receiving data describing a model, the model describing a curve network; determining boundary continuity constraints for each edge, of each face, in the model; combining the determined boundary continuity constraints to determine respective boundary continuity for each face; and determining, using the respective boundary continuity constraints, a respective surface patch for each face.

24 Claims, 11 Drawing Sheets

COMPUTING BOUNDARY CONTINUITY CONSTRAINTS FOR PATCHING CURVE NETWORKS

BACKGROUND

This specification relates to computer-aided design (CAD) applications and, in particular, to computing boundary constraints for patching arbitrary curve networks.

Computer-aided design (CAD) can be used to model surfaces that resemble smooth real-world objects. Modeling a curved object in a CAD model typically involves the creation of one or more curved objects in the CAD model. Creating a curved object in a CAD model generally involves creating a network of curves (curve network) that represent the curved object by calculating intersecting points and creating faces that are formed by closed connected curve segments. The faces are connected using appropriate boundary continuity constraints to generate surface patches that represent the curved object.

Boundary continuity constraints between surface patches play a role in interpolating a curve network. Continuity is a measurement of how two surfaces or curves connect. For example, global features, such as sharp corners and smooth transitions between surface patches, are determined by continuity constraints. Generally, curve networks can be interpolated using either a global method or a local method. Global methods generally involve evaluating all of the surface patches in a curve network to create a global system for the curve network. A common problem with global methods is that the global system may become too large to solve as the number of curves increases. Unlike global methods, local methods attempt to construct surface patches for each face independently. Generally, local methods involve creating surface patches beginning with a seed face and continuing onto adjacent faces until all faces are patched. Conventional global and local methods generally are not able to specify continuity constraints between surface patches in such a way that the constraints are not only efficiently computed but also reflect the intrinsic shape of input curve networks.

SUMMARY

Continuity constraints for patching arbitrary curve networks can be determined, for each face in a curve network, using local geometric information of the surface patch. In particular, the continuity constraints are computed separately for each edge of each surface patch. For each edge of a surface patch, derivatives of the edge's adjacent edges are evaluated and used to create two sets of derivative fields. The two sets of derivative fields are blended to produce continuity constraints for the edge. Additional operations are performed to ensure continuity between derivative fields for adjacent edges.

In general, one aspect of the subject matter described in this specification can be embodied in a method that includes receiving data describing a model, the model describing a curve network; determining boundary continuity constraints for each edge, of each face, in the model; combining the determined boundary continuity constraints to determine respective boundary continuity for each face; and determining, using the respective boundary continuity constraints, a respective surface patch for each face. Other embodiments of this aspect include corresponding systems, apparatus, and computer program products.

These and other embodiments can optionally include one or more of the following features. Determining boundary continuity constraints for each edge, of each face, in the model includes: determining, for an edge of a face, respective end derivatives of a first and second adjacent edge; determining, based on the respective end derivatives, respective derivative fields for the first and second adjacent edges; and determining, based on the respective derivative fields for the first and second adjacent edges, final derivative fields for the edge. Determining, based on the respective end derivatives, respective derivative fields for the first and second adjacent edges includes: sweeping the respective end derivatives of the first and second edge along the edge. Determining, based on the respective derivative fields for the first and second adjacent edges, final derivative fields for the edge includes: blending the respective derivative fields for the first and second adjacent edges.

Blending is performed using a linear function to achieve a $G^0$ continuity between the first and second adjacent edges. Blending is performed using a cubic Hermite interpolation polynomial to achieve a $G^1$ continuity between the first and second adjacent edges. Blending is performed using a quintic Hermite interpolation polynomial to achieve a $G^2$ continuity between the first and second adjacent edges. The respective boundary continuity constraints for each respective face are determined using local geometric information of the respective face.

Particular embodiments of the subject matter described in this specification can be implemented to realize one or more of the following advantages. Continuity constraints for each surface patch can be determined independently using the curve network's local geometric information. By generating continuity constraints independently for each surface patch, sharp and smooth features in a curve network can be constructed without having to solve a global system of the curve network. Continuity constraints can be represented as a set of $G^2$ continuous derivative fields along boundaries of the surface patches in the curve network. Continuity constraints can be determined for surface patches having an arbitrary shape (e.g., surface patches having more than four sides).

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
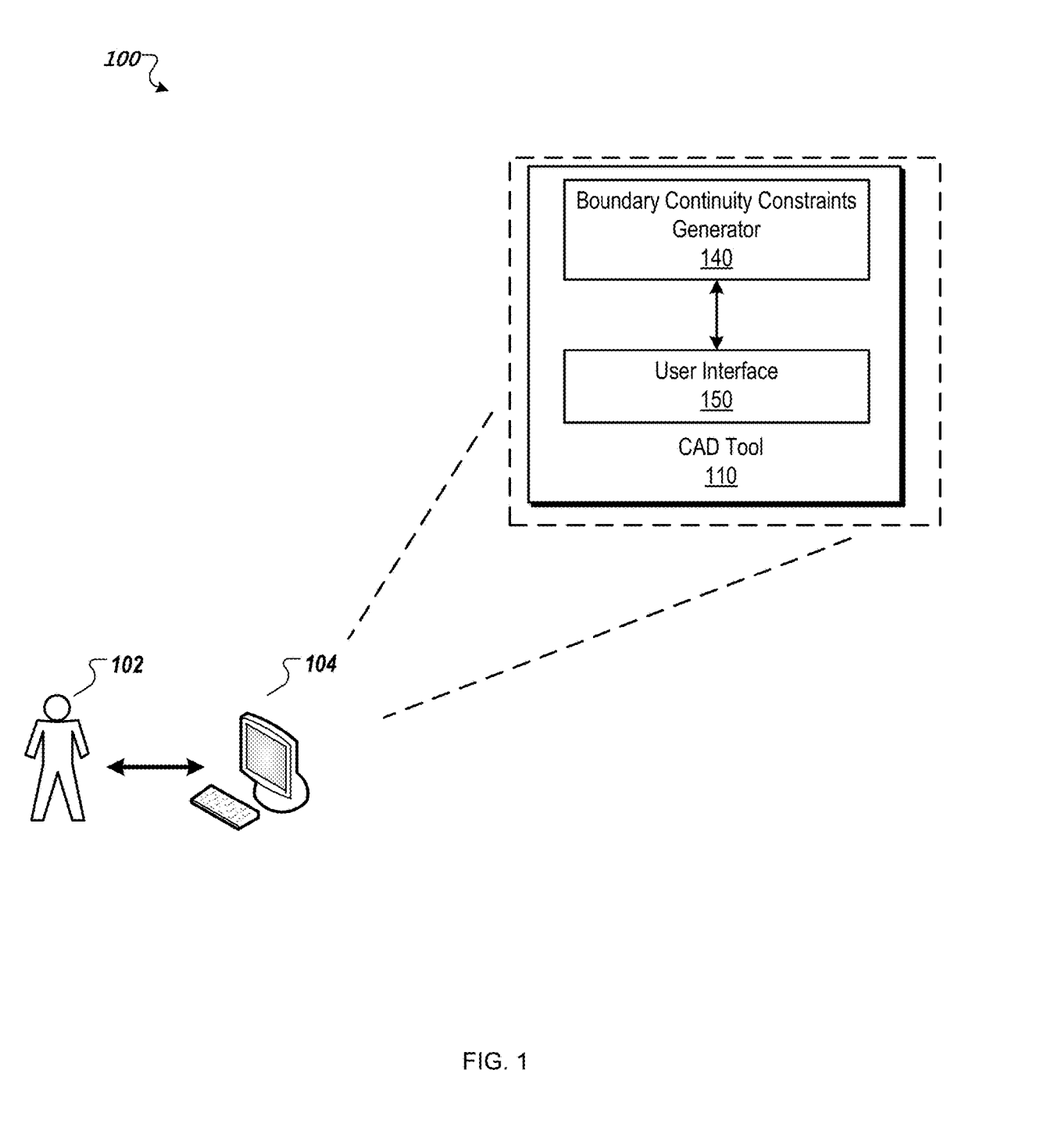
FIG. 1 is a diagram of an example system for determining boundary continuity constraints for patching arbitrary curve networks.

FIG. 1 is a high-level illustration of a CAD system 100 for determining boundary continuity constraints for patching arbitrary curve networks. Although this diagram depicts objects/processes as logically separate, such depiction is merely for illustrative purposes. The objects/processes portrayed in this figure can be arbitrarily combined or divided into separate software, firmware, or hardware components. Furthermore, such objects/processes, regardless of how they are combined or divided, can execute on the same data processing apparatus or can be distributed among different data processing apparatus connected by one or more networks (e.g., the Internet).

The CAD system 100 includes a computing device 104, e.g., a laptop or desktop computer, that is capable of executing a CAD tool 110 (e.g., a computer graphics program). The CAD system 100 combines the well-known capabilities of a CAD program with common spatial management features. The CAD tool 110 includes, without limitation, a boundary continuity constraints generator 140 and a user interface 150. The CAD tool 110 allows a user 102 to generate and/or load CAD models that describe three-dimensional representations of objects, e.g., models of curved objects. In some implementations, the computing device 104 is configured to interact with the CAD tool 110 through a cloud service. The representation can be viewed and, optionally, modified, through the user interface 150. The representation may be freely modeled by the user through the user interface 150 using CAD tool 110. The boundary continuity constraints generator 140 is configured to determine continuity constraints for patching arbitrary curve networks, as described below in reference to FIGS. 2 and 3.

Figure 2:
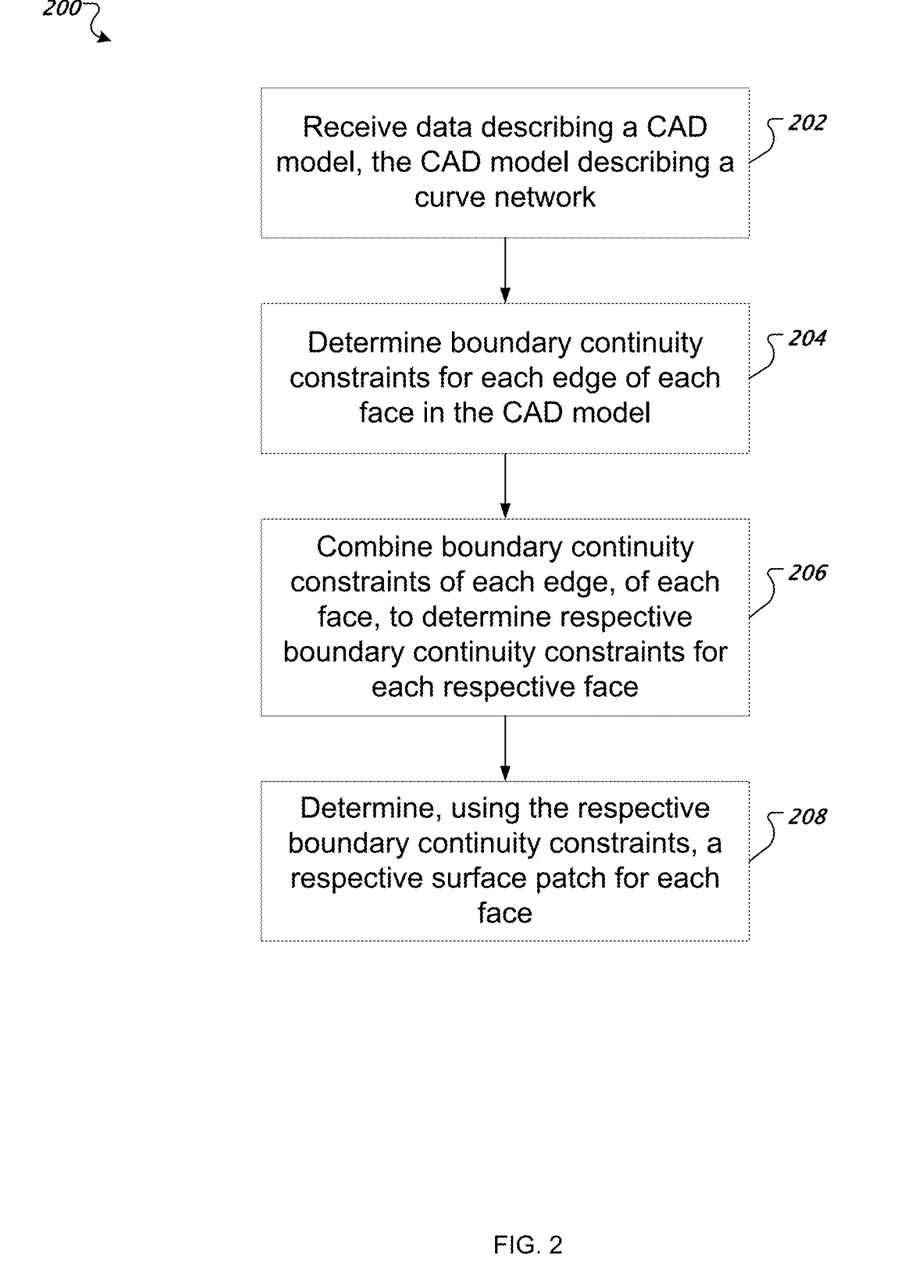
FIG. 2 is a flow diagram of an example technique for determining boundary continuity constraints for a curve network.

FIG. 2 is a flow diagram of an example technique 200 for determining boundary continuity constraints for a curve network. For convenience, the technique 200 will be described with respect to a system, including one or more data processing apparatus, that performs the technique 200. For example, the technique 200 can be performed by a CAD system, e.g., CAD system 100 of FIG. 1.

The system receives data describing a CAD model (202). In some implementations, the CAD model describes a curve network. The curve network is generally made up of a series of intersecting curves. The curves each intersect at vertices. Depending on the implementation, the curves can be non-uniform rational b-spline (NURBS) curves, or procedurally-defined surface or surface intersection curves. Curve segments between two vertices are called edges. In other words, an edge is a subset of a curve and generally has at least the same order of smoothness of the underlying curve. A face is defined by a set of closed connected edges that form an outer loop and, sometimes, inner loops that represent holes. Thus, the curve network is defined by a collection of vertices, edges, and faces. In some implementations, the CAD model is a solid model from which data describing edges and faces are determined.

The system determines boundary continuity constraints for each edge, of each face, in the CAD model (204). Continuity constraints can be specified for each edge to designate an order of smoothness at the edge. Continuity constraints are generally specified using a continuity order. A $G^0$ continuity indicates that two adjacent faces share the same positions along an edge. A $G^1$ continuity indicates that two adjacent faces have the same tangent planes along an edge. A $G^2$ continuity indicates that two adjacent faces have the same curvature in all directions along an edge.

Continuity between two adjacent faces can also be expressed using derivatives of the two adjacent faces' underlying surfaces along a common edge. If two underlying surfaces have the same parameterization, then the continuity between them indicates that their derivatives of certain order are the same. Surfaces having different parameterization can be reparameterized. Derivatives of a surface along a particular boundary or curve form a derivative field. Derivative fields for an edge, including those of its adjacent edges, can be determined to capture a face's shape. Determining boundary continuity constraints for an edge is described in more detail below in reference to FIG. 3.

The system combines boundary continuity constraints of each edge, of each face, in the plurality of faces to determine respective boundary continuity constraints for each respective face (206). The system combines derivative fields for all edges of a face to determine boundary continuity constraints for the face. The boundary continuity constraints are represented in surface derivative form and, thus, can be converted to geometric properties, e.g., normal or curvatures. These geometric properties can be used by generally known patching techniques to generate a surface patch. Continuity constraints of adjacent edges are can be made $G^2$ to each other using Equations (5), (6) and (7), as described below.

The system determines, using the respective boundary continuity constraints, a respective surface patch for each face in the plurality of faces (208). As described above, the system can generate surface patches using generally known patching techniques. The system can create an n-sided surface patch for a face where n is based on the number of edges in a face. A face can be interpolated using surface patches of various types once the face is created by a set of closed connected edges and continuity constraints have been specified along the face's boundary. For example, a Coons surface patch can be created for a face that has four edges.

Figure 3:
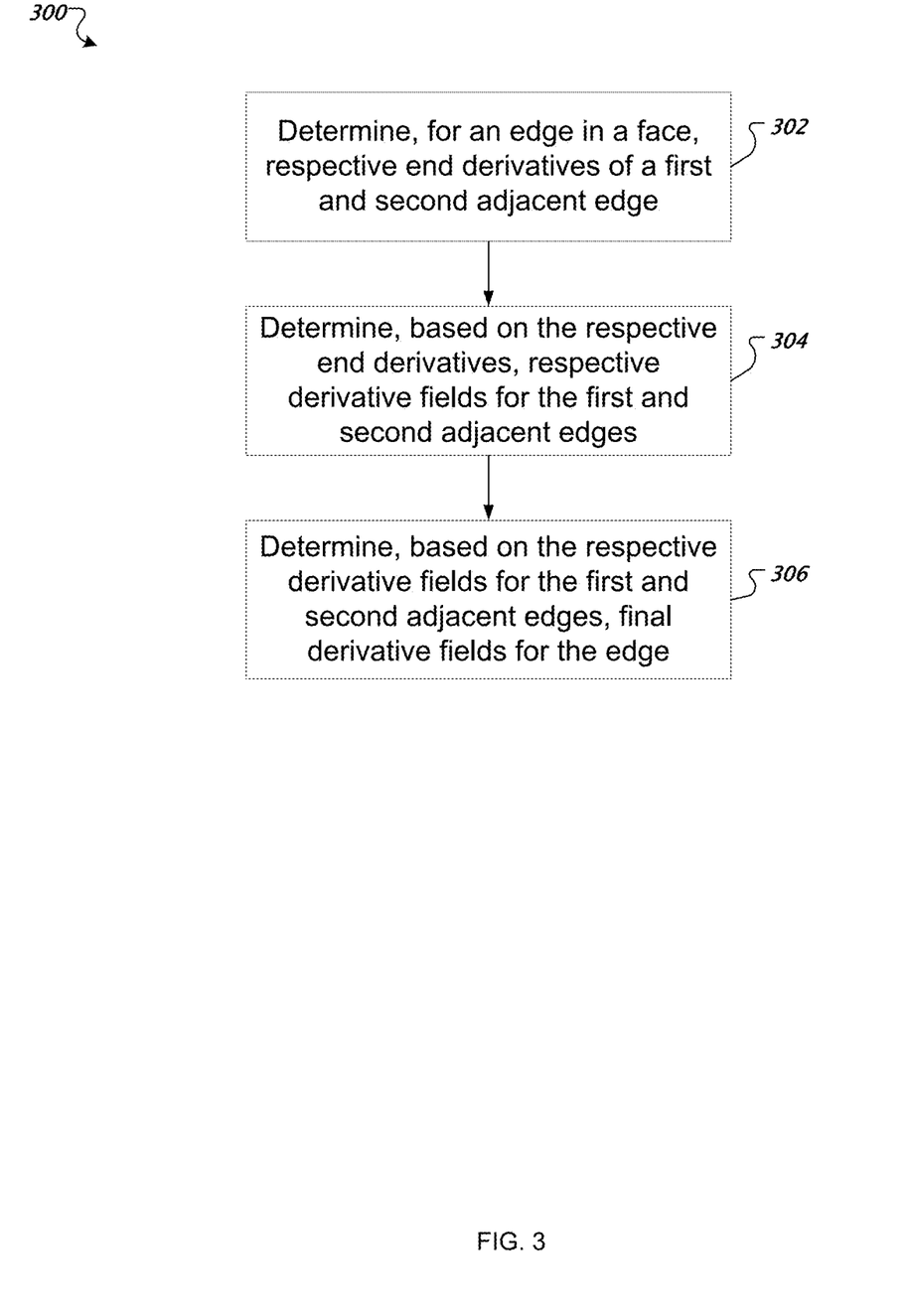
FIG. 3 is a flow diagram of an example technique for determining boundary continuity constraints for an edge.

FIG. 3 is a flow diagram of an example technique 300 for determining boundary continuity constraints for an edge. For convenience, the technique 300 will be described with respect to a system, including one or more data processing apparatus, that performs the technique 300. For example, the technique 300 can be performed by a CAD system, e.g., CAD system 100 of FIG. 1.

The system determines, for an edge in a face, respective end derivatives of a first and second adjacent edge, the first and second adjacent edges being connected to the edge in the face (302). For an edge $E_i$ a first adjacent edge $E_{i-1}$, and a second adjacent edge $E_{i+1}$, the system identifies respective underlying curves $C_i$, $C_{i-1}$, $C_{i+1}$. For notational convenience, we assume the curves $C_i$, $C_{i-1}$, $C_{i+1}$ are parametrized by arc length so that each curve's parameter varies from 0 to 1, e.g. $C(t)$, $t \in [0,1]$. Thus, for a curve, $C'(t)$ represents the unit tangent vector and $C''(t)$ represents the curvature vector of the curve. Further, $C_i(t)$ goes from $C_{i-1}$ to $C_{i+1}$ and both $C_{i-1}$ and $C_{i+1}$ point away from the end points of $C_i$, that is, $C_i(0)=C_{i-1}(0)$ and $C_i(1)=C_{i+1}(0)$.

The system determines, based on the respective end derivatives, respective derivative fields for the first and second adjacent edges (304). The system can determine respective derivative fields for adjacent edges by sweeping derivatives at $C_{i-1}(0)$ and $C_{i+1}(0)$ along $C_i(t)$. Sweeping a vector $\vec{V}$ along a curve $C(t)$ can be performed using a sweeping equation. One example sweeping equation is reproduced below:

$$F(t)=C(t)+\vec{V}M(t) \quad \text{(Equation 1)}$$

where $M(t)$ is an orthornormal frame moving along the curve $C(t)$ and can be determined using the rotation minimization criterion, and where $\vec{V}$ is a vector along the curve $C(t)$.

A derivative field of first order for a curve $C_{i-1}(0)$ along curve $C_i(t)$ can be determined using Equation 1 by replacing $\vec{V}$ with $C'_{i-1}(0)$. A derivative field of second order for the curve $C_{i-1}(0)$ along curve $C_i(t)$ can be determined using Equation 1 by replacing $\vec{V}$ with $C''_{i-1}(0)$. Similarly, a derivative field of first order for a curve $C_{i+1}(0)$ along curve $C_i(t)$ can be determined using Equation 1 by replacing $\vec{V}$ with $C'_{i+1}(0)$. A derivative field of second order for the curve $C_{i+1}(0)$ along curve $C_i(t)$ can be determined using Equation 1 by replacing $\vec{V}$ with $C'_{i+1}(0)$.

The derivative fields computed above can be represented in a more compact form if we consider them as derivatives of a degenerated sweep surface whose section curve degenerates to a point with derivative vectors. Thus, for curve $C_{i-1}$, equation (1) can be rewritten to:

$$F_0(u,v)|_{u=0}=C_i(v)+C_{i-1}(u)|_{u=0}M(v) \quad \text{(Equation 2)}$$

where $v$ is the direction along $C_i$, where $u$ is the direction along $C_{i-1}$, and where where $M(v)$ is an orthornormal frame moving along the curve $C_i(v)$.

Similarly, for curve $C_{i+1}$, equation (1) can be rewritten to:

$$F_1(u,v)|_{u=0}=C_i(v)+C_{i+1}(u)|_{u=0}M(v) \quad \text{(Equation 3)}$$

where $v$ is the direction along $C_i$, where $u$ is the direction along $C_{i+1}$, and where where $M(v)$ is an orthornormal frame moving along the curve $C_i(v)$.

Using equations (2) and (3), the system can evaluate derivatives at any point on a curve $C_i(v)$ in terms of surface derivatives. For example, using equation (2), $1^{st}$ derivatives for a curve $C_{i-1}$ can be determined by:

$$\begin{cases} \dfrac{\partial F_0}{\partial u} = C'_{i-1}(0)M(v) \\ \dfrac{\partial F_0}{\partial v} = C'_i(v) + C_{i-1}(0)M(v) \end{cases}$$

The system determines, based on the respective derivative fields for the first and second adjacent edges, final derivative fields for the edge (306). The system can determine final derivative fields for an edge $E_i$ by blending derivative fields for adjacent edges $E_{i-1}$ and $E_{i+1}$, as determined by equations (2) and (3), respectively. One example function for blending adjacent edges is reproduced below:

$$S_i(u,v)=(1-\alpha(v))F_0(u,v)+\alpha(v)F_1(u,v) \quad \text{(Equation 4)}$$

where $\alpha(v)$ is a blending function with $\alpha(0)=0$ and $\alpha(1)=1$, where $F_0(u, v)$ is a derivative field for curve $C_{i-1}$, and where $F_1(u, v)$ is a derivative field for curve $C_{i+1}$.

The system also determines the blending function $\alpha(v)$ for achieving a continuity, e.g., a $G^1$ or a $G^2$ continuity, between adjacent derivative fields. Since derivative fields are created for each edge independently, the adjacent derivative fields need to be continuous in order to produce the final patch for the face. For example, if a surface patch has a $G^2$ continuity to the boundary continuity constraints, derivative fields for adjacent edges for the surface patch also need to have a $G^2$ continuity to each other.

The system can specify a linear function for the blending function $\alpha(v)$ to satisfy a $G^0$ continuity between two adjacent derivative fields. Using equation (4), it can be seen that a $G^0$ continuity between two adjacent derivative fields $S_i(u, v)$ and $S_{i+1}(u, v)$ is automatically satisfied since $S_i(0,1) = S_{i+1}(0,0)$.

Achieving a higher order of continuity, e.g., a $G^1$ or a $G^2$ continuity, between two adjacent derivative fields can be more difficult. One difficulty is due to the fact that derivative fields for an edge result from a blending of two different derivative fields. To simplify the blending process, the influence of derivative fields can be separated at the ends of an edge. That is, the derivatives of $S_i$ at the edge ends are the same as that of $F_0$ or $F_1$, respectively. By doing this, the problem is reduced to that of a continuity between $F_1$ of $E_1$ and $F_0$ of $E_{i+1}$. This can be achieved using an appropriate blending function, as described below.

If $G^1$ continuity is desired, the system can set $\alpha'(0)=\alpha'(1)=0$ and can specify a cubic Hermite interpolation polynomial for the blending function $\alpha(v)$. This can be verified using equation (4) for two adjacent edges $E_1$ and $E_{i+1}$, where $S_i(u_i, v_i)$ and $S_{i+1}(u_{i+1}, v_{i+1})$ each represent an adjacent derivative field. Note that $u_i$ and $v_{i+1}$ have the same direction, while directions of $v_i$ and $u_{i+1}$ are opposite. Thus, using equation (4), it can be shown that $S_i$ and $S_{i+1}$ have the same normal vector at their touch point $S_i(0,1)$ based on the following:

$$\begin{cases} \dfrac{\partial S_i(0,1)}{\partial u_i} = \dfrac{\partial S_{i+1}(0,0)}{\partial v_{i+1}} \\ \dfrac{\partial S_i(0,1)}{\partial v_i} = -\dfrac{\partial S_{i+1}(0,0)}{\partial u_{i+1}} \end{cases}$$

If $G^2$ continuity is desired, the system can set $\alpha''(0)=\alpha''(1)=0$ and can specify a quintic Hermite interpolation polynomial for the blending function $\alpha(v)$. This can be verified using equation (4) for two adjacent edges $E_1$ and $E_{i+1}$, where $S_i(u_i, v_i)$ and $S_{i+1}(u_{i+1}, v_{i+1})$ each represent an adjacent derivative field. Note that $u_i$ and $v_{i+1}$ have the same direction, while directions of $v_i$ and $u_{i+1}$ are opposite. Thus, using equation (4), it can be shown that $S_i$ and $S_{i+1}$ have the same normal vector at their touch point $S_i(0,1)$ based on the following:

$$\begin{cases} \dfrac{\partial^2 S_i(0,1)}{\partial u_i^2} = \dfrac{\partial^2 S_{i+1}(0,0)}{\partial v_{i+1}^2} \\ \dfrac{\partial^2 S_i(0,1)}{\partial v_i^2} = \dfrac{\partial^2 S_{i+1}(0,0)}{\partial u_{i+1}^2} \end{cases}$$

Achieving $G^2$ continuity can also require agreement of twist vectors. Due to the parametrization used for $S_i$ and $S_{i+1}$, this effectively requires:

$$\dfrac{\partial^2 S_i(0,1)}{\partial u_i \partial v_i} = -\dfrac{\partial^2 S_{i+1}(0,0)}{\partial u_{i+1} \partial v_{i+1}} \quad \text{(Equation 5)}$$

To satisfy equation (5), the system can set the twist vectors of two adjacent derivative fields at corner points to zero such that:

$$\frac{\partial^2 S_i(0,0)}{\partial u_i \partial v_i} = -\frac{\partial^2 S_{i+1}(0,1)}{\partial u_i \partial v_i} = 0 \quad \text{(Equation 6)}$$

Setting the twist vectors to zero, however, can sometimes introduce artifacts in a surface patch's shape. To limit the impact of such twist vectors, the system can design the twist vectors so that they can swiftly transition from zero at starting and ending points to the ones defined by the sweep equation, e.g., equation (1). For this purpose, the system introduces an additional blending function and modifies equation (3) as follows:

$$F_0(u,v)|_{u=0} = C_i(v) + C_{i-1}(u)|_{u=0}((1-\beta(v))I + \beta(v)M(v)) \quad \text{(Equation 7)}$$

where I is the identity matrix, β(v) is the blending function, and where β(v) is constructed to satisfy β(0)=0, β(1)=1 and β'(0)=β"(0)=β'(1)=β"(1)=0.

$F_1(u, v)$ is redefined in a similar way.

Figure 4:
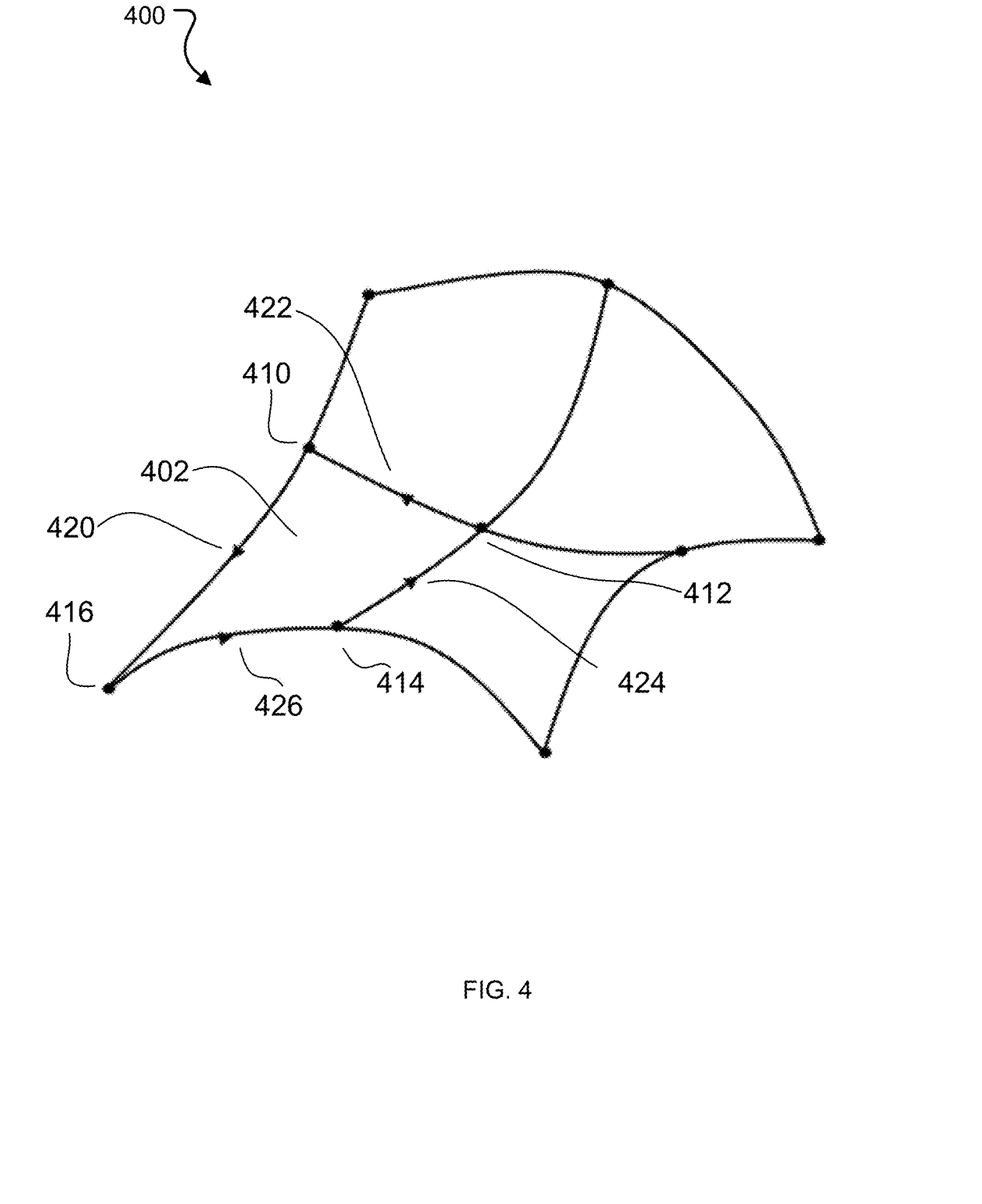
FIG. 4 is an view of an example curve network.

FIG. 4 is a view of an example curve network 400. The curve network 400 is made up of a series of intersecting curves. The curves each intersect at vertices, e.g., vertices 410, 412, 414, and 416. Depending on the implementation, the curves can be non-uniform rational b-spline (NURBS) curves, or procedurally-defined surface or surface intersection curves. Curve segments between two vertices are called edges, e.g., edges 420, 422, 424, and 426. In other words, an edge is a subset of a curve and generally has at least the same order of smoothness of the underlying curve. Edges are bound by vertices. For example, edge 420 is bound by vertices 410 and 416. Closed connected edges form a loop. For example, closed connected edges 420, 422, 424, and 426 form an outer loop of a face 402. Faces can have several loops but are limited to one outer loop. Further, while an edge can be shared by at most two faces, a vertex can have any number of neighboring faces.

Figure 5:
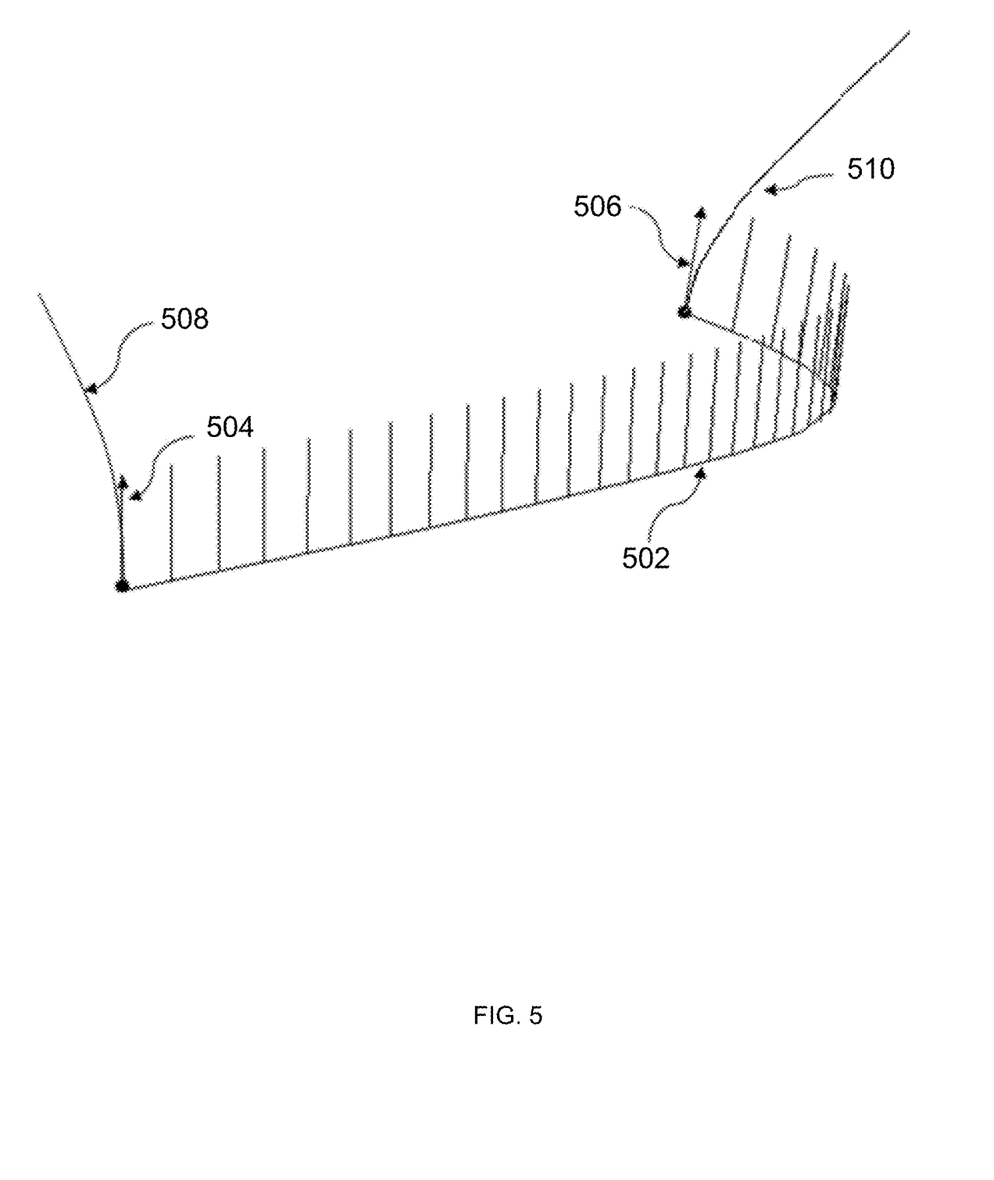
FIG. 5 is an example view depicting a blending of two swept vectors.

FIG. 5 is an example view depicting a blending of two swept vectors. FIG. 5 shows a 1$^{st}$ derivative field of an edge $E_i$ 502 resulting from a blending of two derivative fields that were generated by sweeping a first tangent vector $C'_{i-1}(0)$ 504 and a second tangent vector $C'_{i+1}(0)$ 506 along the edge $E_i$ 502, respectively. The first tangent vector $C'_{i-1}(0)$ is the end tangent vector of adjacent edge curve $C_{i-1}$ 508. The second tangent vector $C'_{+1}(0)$ is the end tangent vector of adjacent edge curve $C_{i+1}$ 510.

Figure 6:
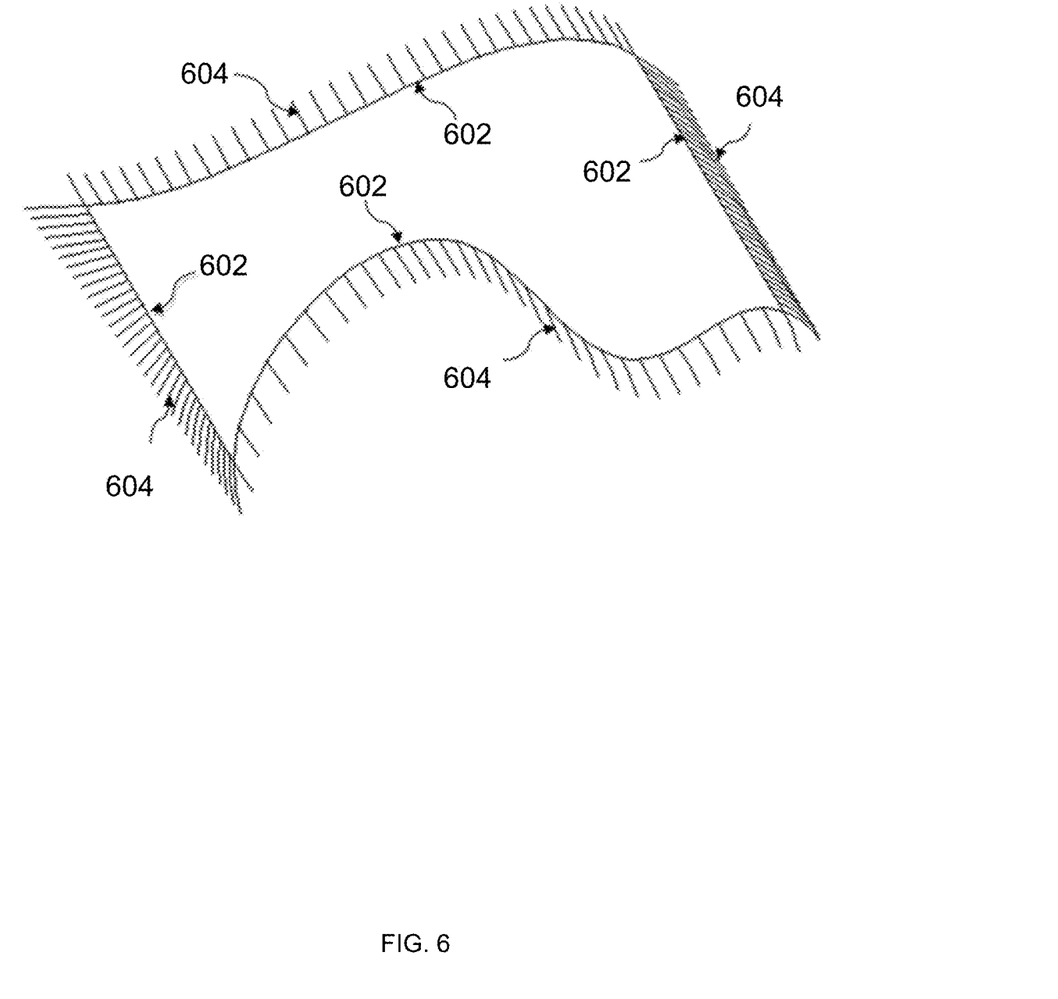
FIG. 6 is an example view of $G^1$ derivative fields of a face.

FIG. 6 is an example view of $G^1$ derivative fields of a face. FIG. 6 shows the input curves 602 of a face and their corresponding derivative fields 604. For illustrative purposes, FIG. 6 depicts $G^1$ derivative fields. However, depending on the implementation, the methods described above can be used to achieve $G^3$ or even higher order of continuity of derivative fields.

Figure 7:
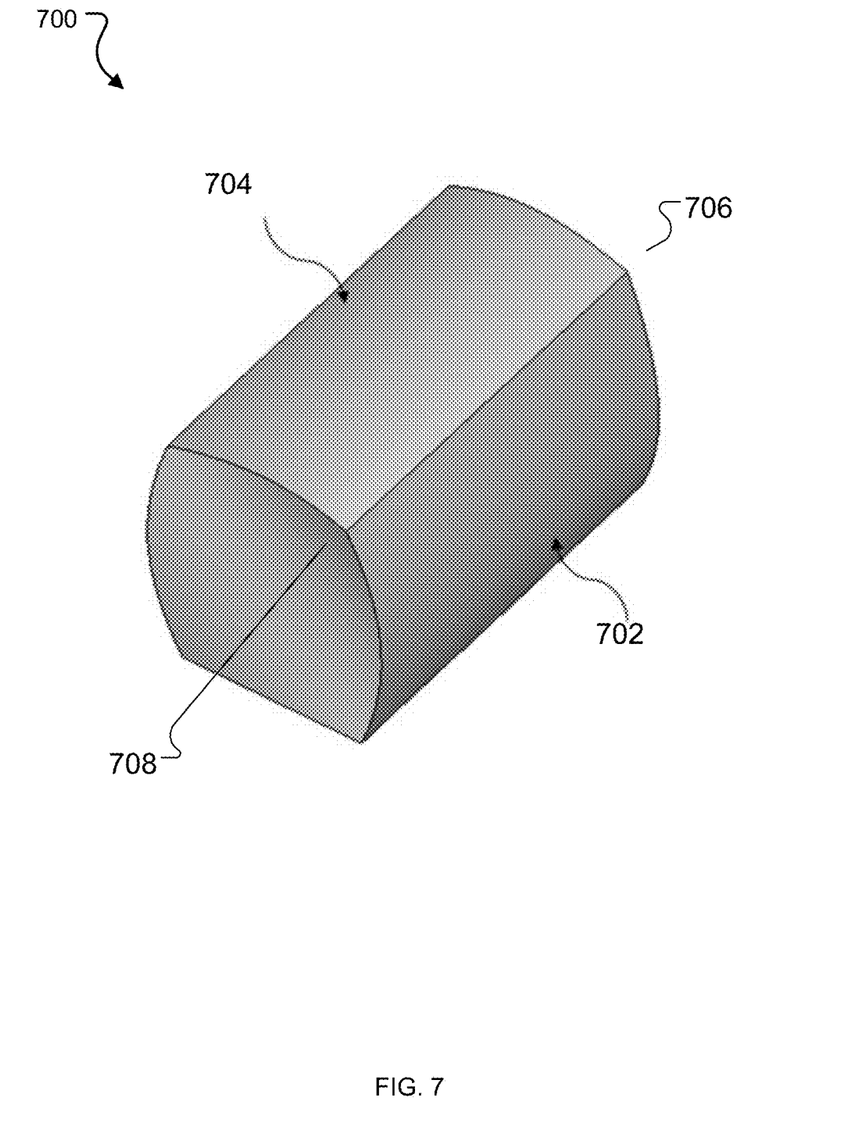
FIG. 7 is an example view of $G^0$ continuity depicting sharp corners in a curve network of a curved object.

FIG. 7 is an example view of $G^0$ continuity depicting sharp corners 706 and 708 in a curve network of a curved object 700. A first surface patch 702 is adjacent to a second surface patch 704. The sharp corners 706 and 708 correspond to the first and second surface patches 702 and 704. The sharp corners 706 and 708 can be smoothed, e.g., transitioned to a $G^2$ continuity, using the techniques described above.

Figure 8:
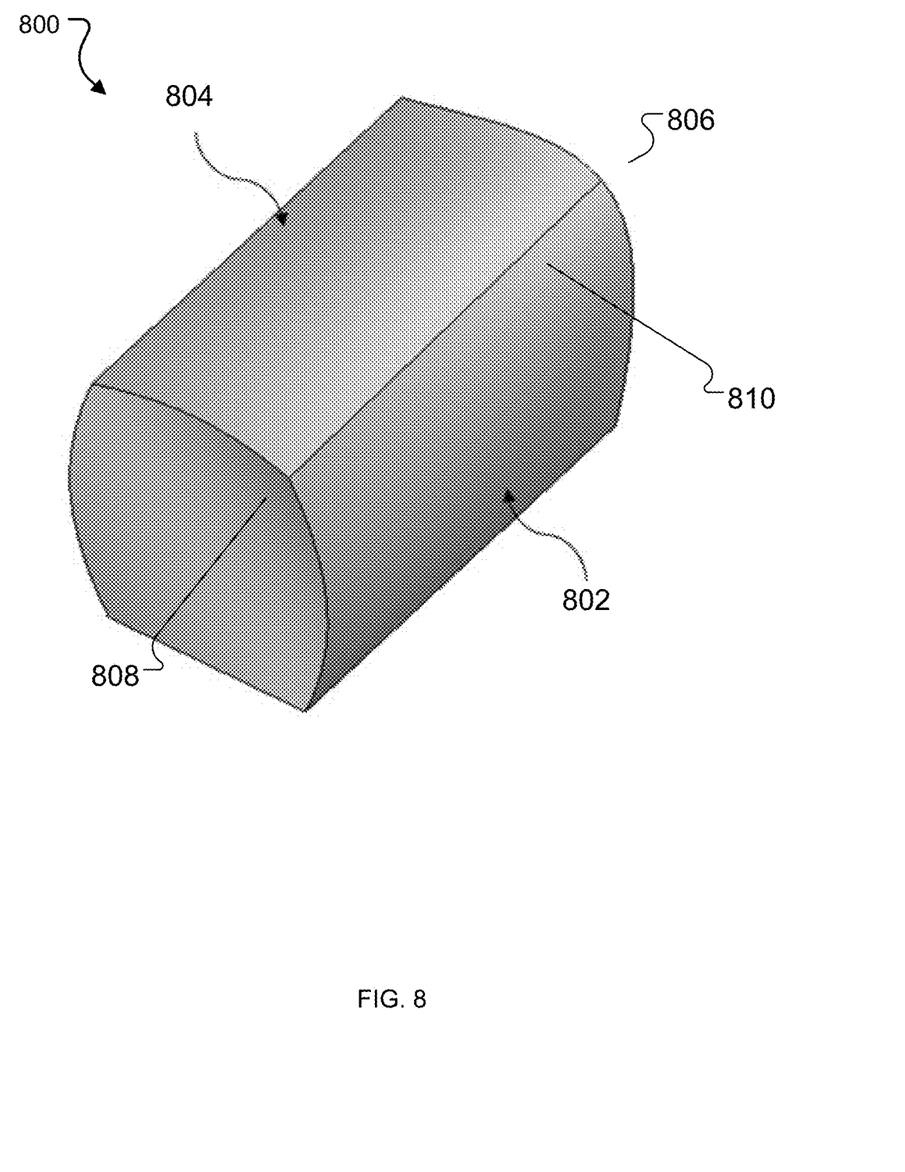
FIG. 8 is an example view of a smooth transition of G0 and G2 continuity between two surface patches of a curved object.

FIG. 8 is an example view of a smooth transition of $G^0$ and $G^2$ continuity between two surface patches 802 and 804 of a curved object 800. In FIG. 8, the two adjacent surface patches 802 and 804 have a $G^0$ continuity at a first corner 808 and a $G^2$ continuity at a second corner 806, as determined by the corresponding input curves. As shown in FIG. 8, the continuity between the two adjacent surface patches 802 and 804 changes gradually from a $G^0$ continuity to a $G^2$ continuity along their common edge 810. The first corner 808 and the second corner 806 can be smoothed using the techniques described above to achieve a $G^2$ continuity between the two adjacent surface patches 802 and 804, as illustrated in FIG. 9.

Figure 9:
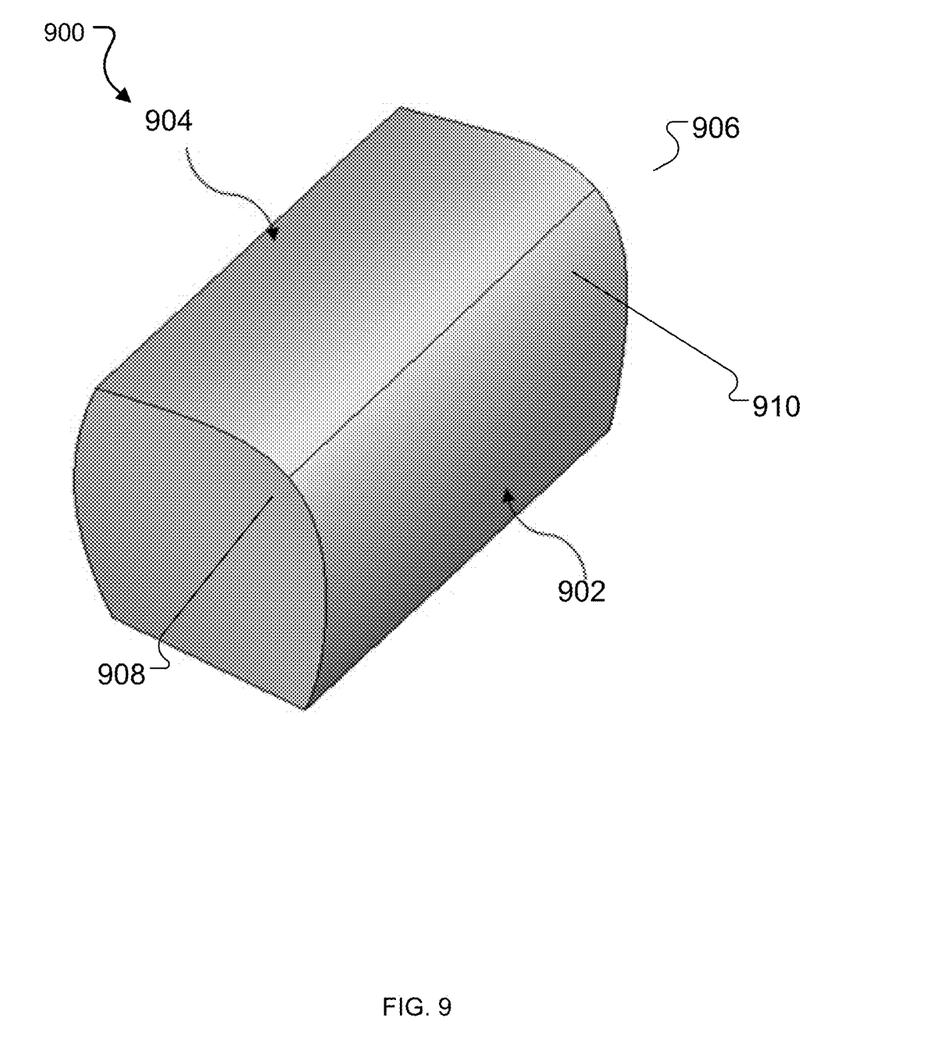
FIG. 9 is an example view depicting creation of $G^2$ continuity between two surface patches of a curved object.

FIG. 9 is an example view depicting creation of $G^2$ continuity between two surface patches 902 and 904 of a curved object 900. As shown in FIG. 9, the two adjacent surface patches 902 and 904 have a $G^2$ continuity along their common edge 910 beginning from a first corner 906 to a second corner 908.

Figure 10:
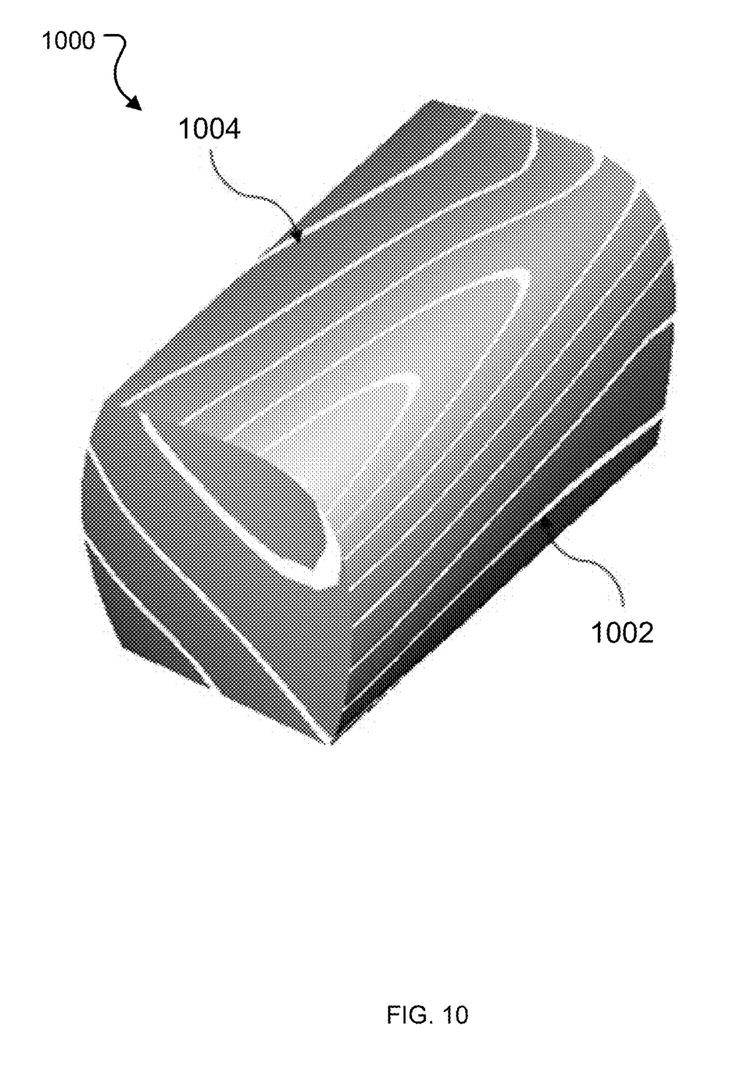
FIG. 10 is an example view of zebra flows between two $G^2$ continuous surface patches of a curved object.

FIG. 10 is an example view of zebra flows between two $G^2$ continuous surface patches 1002 and 1004 of a curved object 1000. The zebra flows confirm a $G^2$ continuity between the two surface patches 1002 and 1004. As shown in FIG. 10, both sharp and smooth transitions in the curved object 1000 are modeled as intended by the input curve network.

Figure 11:
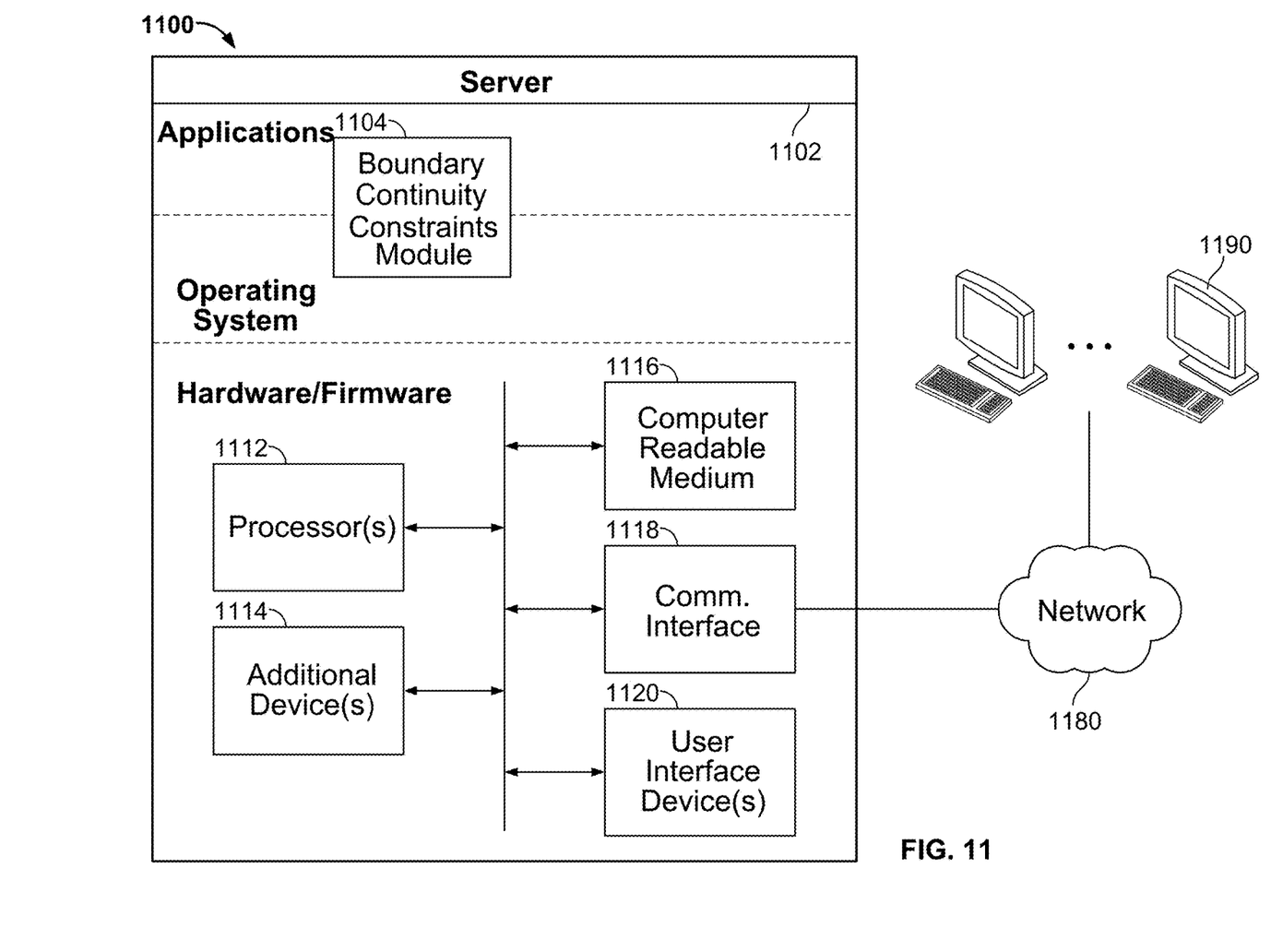
FIG. 11 is a schematic diagram of a generic computer system.

FIG. 11 is a schematic diagram of an example server 1102. The server 1102 is optionally connected to one or more user or client computers 1190 through a network 1180. The server 1102 consists of one or more data processing apparatuses. While only one data processing apparatus is shown in FIG. 11, multiple data processing apparatus can be used. The server 1102 includes various software modules, e.g. executable software programs or libraries, including one or more of: a boundary continuity constraints module 1104. Although several software modules are illustrated, there may be fewer or more software modules. Moreover, the software modules can be distributed on one or more data processing apparatus connected by one or more networks or other suitable communication mediums.

The server 1102 also includes hardware or firmware devices including one or more processors 1112, one or more additional devices 1114, a computer readable medium 1116, a communication interface 1118, and one or more user interface devices 1120. Each processor 1112 is capable of processing instructions for execution within the server 1102. In some implementations, the processor 1112 is a single or multi-threaded processor. Each processor 1112 is capable of processing instructions stored on the computer readable medium 1116 or on a storage device such as one of the additional devices 1114. The server 1102 uses its communication interface 1118 to communicate with one or more computers 1190, for example, over a network 1180. Examples of user interface devices 1120 include a display, a camera, a speaker, a microphone, a tactile feedback device, a keyboard, and a mouse. The server 1102 can store instructions that implement operations associated with the modules described above, for example, on the computer readable medium 1116 or one or more additional devices 1114, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by a computer-aided design (CAD) system comprising one or more computers, the method comprising:
    receiving a model representing a three-dimensional object in the (CAD) system, the model including a plurality of edges of a curve network, wherein the curve network includes one or more closed loops of edges, and wherein each respective closed loop of edges in the curve network represents a respective face of the object;
    determining, by the CAD system for a first end point of a particular edge of a face of the model, a first vector of a first adjacent edge of the face, wherein the first adjacent edge meets the particular edge at the first end point, and wherein the first vector represents an orientation of the first adjacent edge where the first adjacent edge meets the first end point of the particular edge;
    determining, by the CAD system for a second end point of the particular edge of the face of the model, a second vector of a second adjacent edge of the face, wherein the second adjacent edge meets the particular edge at the second end point, and wherein the second vector represents an orientation of the second adjacent edge where the second adjacent edge meets the second end point of the particular edge;
    generating, by the CAD system, a first derivative field including sweeping the first vector of the first adjacent edge along the particular edge between the first end point and the second end point;
    generating, by the CAD system, a second derivative field including sweeping the second vector of the second adjacent edge along the particular edge between the first end point and the second end point; and
    generating, by the CAD system, boundary continuity constraints for the particular edge of the face by applying a blending function to respective components of the first derivative field and the second derivative field to generate a blended derivative field defining the boundary continuity constraints for the particular edge.

2. The method of claim 1, wherein the blending is performed using a linear function to achieve a $G^0$ continuity between the first and second adjacent edges.

3. The method of claim 1, wherein the first vector and the second vector are tangent vectors, and wherein generating the blended derivative field for the particular edge comprises blending the first derivative field and the second derivative field to achieve a $G'$ continuity between the first adjacent edge and the second adjacent edge.

4. The method of claim 1, wherein the first vector and the second vector are curvature vectors, and wherein generating the blended derivative field for the particular edge comprises blending the first derivative field and the second derivative field to achieve a $G^2$ continuity between the first adjacent edge and the second adjacent edge.

5. The method of claim 1, wherein determining the boundary continuity constraints for the particular edge comprises determining the boundary continuity constraints using only local geometric information of the respective face.

6. A non-transitory computer storage medium having instructions stored thereon that, when executed by a computer-aided design (CAD) system comprising one or more computers, cause the CAD system to perform operations comprising:
    receiving a model representing a three-dimensional object in the CAD system, the model including a plurality of edges of a curve network, wherein the curve network includes one or more closed loops of edges, and wherein each respective closed loop of edges in the curve network represents a respective face of the object;
    determining, by the CAD system for a first end point of a particular edge of a face of the model, a first vector of a first adjacent edge of the face, wherein the first adjacent edge meets the particular edge at the first end point, and wherein the first vector represents an orientation of the first adjacent edge where the first adjacent edge meets the first end point of the particular edge;
    determining, by the CAD system for a second end point of the particular edge of the face of the model, a second vector of a second adjacent edge of the face, wherein the second adjacent edge meets the particular edge at the second end point, and wherein the second vector represents an orientation of the second adjacent edge where the second adjacent edge meets the second end point of the particular edge;

generating, by the CAD system, a first derivative field including sweeping the first vector of the first adjacent edge along the particular edge between the first end point and the second end point;

generating, by the CAD system, a second derivative field including sweeping the second vector of the second adjacent edge along the particular edge between the first end point and the second end point; and generating, by the CAD system, boundary continuity constraints for the particular edge of the face by applying a blending function to respective components of the first derivative field and the second derivative field to generate a blended derivative field defining the boundary continuity constraints for the particular edge.

7. The medium of claim 6, wherein the blending is performed using a linear function to achieve a $G^0$ continuity between the first and second adjacent edges.

8. The medium of claim 6, wherein the first vector and the second vector are tangent vectors, and wherein generating the blended derivative field for the particular edge comprises blending the first derivative field and the second derivative field to achieve a G' continuity between the first and second adjacent edges.

9. The medium of claim 6, wherein the first vector and the second vector are curvature vectors, and wherein generating the blended derivative field for the particular edge comprises blending the first derivative field and the second derivative field to achieve a $G^2$ continuity between the first adjacent edge and the second adjacent edge.

10. The medium of claim 6, wherein determining the boundary continuity constraints for the particular edge comprises determining the boundary continuity constraints using only local geometric information of the respective face.

11. A computer-aided design (CAD) system comprising:
one or more computers and one or more storage devices storing instructions that are operable, when executed by the one or more computers, to cause the one or more computers to perform operations comprising:

receiving a model representing a three-dimensional object in the CAD system, the model including a plurality of edges of a curve network, wherein the curve network includes one or more closed loops of edges, and wherein each respective closed loop of edges in the curve network represents a respective face of the object;

determining, by the CAD system for a first end point of a particular edge of a face of the model, a first vector of a first adjacent edge of the face, wherein the first adjacent edge meets the particular edge at the first end point, and wherein the first vector represents an orientation of the first adjacent edge where the first adjacent edge meets the first end point of the particular edge;

determining, by the CAD system for a second end point of the particular edge of the face of the model, a second vector of a second adjacent edge of the face, wherein the second adjacent edge meets the particular edge at the second end point, and wherein the second vector represents an orientation of the second adjacent edge where the second adjacent edge meets the second end point of the particular edge;

generating, by the CAD system, a first derivative field including sweeping the first vector of the first adjacent edge along the particular edge between the first end point and the second end point;

generating, by the CAD system, a second derivative field including sweeping the second vector of the second adjacent edge along the particular edge between the first end point and the second end point; and generating, by the CAD system, boundary continuity constraints for the particular edge of the face by applying a blending function to respective components of the first derivative field and the second derivative field to generate a blended derivative field defining the boundary continuity constraints for the particular edge.

12. The system of claim 11, wherein the blending is performed using a linear function to achieve a $G^0$ continuity between the first and second adjacent edges.

13. The system of claim 11, wherein the first vector and the second vector are tangent vectors, and wherein generating the blended derivative field for the particular edge comprises blending the first derivative field and the second derivative field to achieve a $G^1$ continuity between the first adjacent edge and the second adjacent edge.

14. The system of claim 11, wherein the first vector and the second vector are curvature vectors, and wherein generating the blended derivative field for the particular edge comprises blending the first derivative field and the second derivative field to achieve a $G^2$ continuity between the first adjacent edge and the second adjacent edge.

15. The system of claim 11, wherein determining the boundary continuity constraints for the particular edge comprises determining the boundary continuity constraints using only local geometric information of the respective face.

16. The method of claim 1, wherein generating the boundary continuity constraints for the particular edge of the face comprises determining the boundary continuity constraints without solving a global system of the curve network.

17. The method of claim 1, wherein generating the first derivative field comprises evaluating a plurality of derivatives using surface derivatives of the three-dimensional object.

18. The method of claim 1, wherein blending the first derivative field and the second derivative field comprises applying a blending function that uses a same measure of continuity for each of the first derivative field and the second derivative field.

19. The computer storage medium of claim 6, wherein generating the boundary continuity constraints for the particular edge of the face comprises determining the boundary continuity constraints without solving a global system of the curve network.

20. The computer storage medium of claim 6, wherein generating the first derivative field comprises evaluating a plurality of derivatives using surface derivatives of the three-dimensional object.

21. The computer storage medium of claim 6, wherein blending the first derivative field and the second derivative field comprises applying a blending function that uses a same measure of continuity for each of the first derivative field and the second derivative field.

22. The system of claim 11, wherein generating the boundary continuity constraints for the particular edge of the face comprises determining the boundary continuity constraints without solving a global system of the curve network.

23. The system of claim 11, wherein generating the first derivative field comprises evaluating a plurality of derivatives using surface derivatives of the three-dimensional object.

24. The system of claim 11, wherein blending the first derivative field and the second derivative field comprises applying a blending function that uses a same measure of continuity for each of the first derivative field and the second derivative field.

* * * * *

UNITED STATES PATENT AND TRADEMARK OFFICE
CERTIFICATE OF CORRECTION

PATENT NO. : 10,706,183 B2
APPLICATION NO. : 13/787570
DATED : July 7, 2020
INVENTOR(S) : Xuejun Sheng and Wayne Catalfano It is certified that error appears in the above-identified patent and that said Letters Patent is hereby corrected as shown below:

In the Claims

Column 12, Line 34, in Claim 3: delete "G'" and insert --$G^1$--, therefor.

Column 13, Line 27, in Claim 8: delete "G'" and insert --$G^1$--, therefor.

Signed and Sealed this
Twenty-fifth Day of August, 2020

Andrei Iancu
*Director of the United States Patent and Trademark Office*